US012475862B2

United States Patent
Guan et al.

(10) Patent No.: US 12,475,862 B2
(45) Date of Patent: Nov. 18, 2025

(54) GOA CIRCUIT WITH SECOND PULL-DOWN CONTROL CIRCUIT UNIT AND DISPLAY PANEL

(71) Applicant: Wuhan China Star Optoelectronics Technology Co., Ltd., Hubei (CN)

(72) Inventors: Yanqing Guan, Hubei (CN); Xiaojuan Cui, Hubei (CN); Fuhsiung Tang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 1336 days.

(21) Appl. No.: 17/262,721

(22) PCT Filed: Dec. 29, 2020

(86) PCT No.: PCT/CN2020/140525
§ 371 (c)(1),
(2) Date: Jan. 24, 2021

(87) PCT Pub. No.: WO2022/095261
PCT Pub. Date: May 12, 2022

(65) Prior Publication Data
US 2025/0182713 A1 Jun. 5, 2025

(30) Foreign Application Priority Data
Nov. 4, 2020 (CN) .......................... 202011216591.8

(51) Int. Cl.
G09G 3/36 (2006.01)

(52) U.S. Cl.
CPC ..... *G09G 3/3677* (2013.01); *G09G 2310/0286* (2013.01); *G09G 2310/08* (2013.01)

(58) Field of Classification Search
CPC .......... G09G 3/3677; G09G 2310/0286; G09G 2310/08
See application file for complete search history.

(56) References Cited

U.S. PATENT DOCUMENTS

| 10,977,979 | B1 | 4/2021 | Xiao et al. | |
| 2016/0335974 | A1 | 11/2016 | Li | |
| 2017/0124975 | A1* | 5/2017 | Xiao | .......... G09G 3/3677 |
| 2017/0124976 | A1 | 5/2017 | Chen | |
| 2017/0193944 | A1* | 7/2017 | Xiao | .......... G09G 3/3677 |
| 2018/0046308 | A1* | 2/2018 | Xiao | .......... G09G 3/3677 |

(Continued)

FOREIGN PATENT DOCUMENTS

| CN | 104821159 | | 8/2015 | |
| CN | 108630167 | A * | 10/2018 | .......... G09G 3/20 |
| CN | 108962168 | | 12/2018 | |

(Continued)

*Primary Examiner* — Adam J Snyder

(57) ABSTRACT

The present disclosure provides a GOA circuit and a display panel, wherein the GOA circuit is provided with a second pull-down control circuit unit (104). Combined with a timing diagram, during a touch period, for a gradual transmission first node (Q), through a third control signal (GAS2) and a second control signal (D2U), the first node (Q) changes from a low-level signal to a high-level signal, so that two leakage paths of the first node (Q) disappear, and there is no leakage path at the first node Q during touch, thereby maintaining stability of the first node Q.

14 Claims, 5 Drawing Sheets

(56) References Cited

U.S. PATENT DOCUMENTS

2019/0129547 A1\* 5/2019 Dai .................. G09G 3/3677
2021/0225311 A1\* 7/2021 Zhang ............... G09G 3/3677

FOREIGN PATENT DOCUMENTS

| CN | 111640389 | 9/2020 |
| CN | 111681625 | 9/2020 |
| CN | 108630167 | 8/2021 |

\* cited by examiner

GOA CIRCUIT WITH SECOND PULL-DOWN CONTROL CIRCUIT UNIT AND DISPLAY PANEL

RELATED APPLICATIONS

This application is a National Phase of PCT Patent Application No. PCT/CN2020/140525 having International filing date of Dec. 29, 2020, which claims the benefit of priority of Chinese Patent Application No. 202011216591.8 filed on Nov. 4, 2020. The contents of the above applications are all incorporated by reference as if fully set forth herein in their entirety.

FIELD AND BACKGROUND OF THE INVENTION

The present disclosure relates to the field of display technology, specifically to a GOA circuit and a display panel.

Currently, as display components of electronic equipment, liquid crystal display devices have been widely used in various electronic products. A gate driver on array (GOA circuit for short) is an important part of a liquid crystal display device, and the GOA is a technology of fabricating a gate line scan driving signal circuit on an array substrate using existing thin film transistor liquid crystal display array manufacturing process to scan gates line by line.

According to types of thin film transistors (TFT) used in panels, display panels based on low-temperature polysilicon (LTPS) technology can be divided into an N-type metal-oxide-semiconductor (NMOS) type, a MOS tube (PMOS) type which comprises an n-type substrate and a p-channel and generates current through flow of holes, and a complementary metal oxide semiconductor (CMOS) type which has both NMOS TFTs and PMOS TFTs. Similarly, GOA circuits are divided into an NMOS circuit, a PMOS circuit, and a CMOS circuit. Compared with the CMOS circuit, the NMOS circuit eliminates a PP (P doping) layer of mask and the corresponding process, which is of great benefit to improving yield and reducing cost. Therefore, development of a stable NMOS circuit has a realistic industrial demand. Carriers of the NMOS TFT are electrons, mobility of which are relatively high. However, compared with the PMOS (carriers are holes), the device is relatively easy to damage, and the panel has insufficient high temperature reliability, which is prone to GOA failure and split screen phenomenon. Especially for in cell touch (ITP) panels, the split screen phenomenon is more likely to occur at a touch pause level.

SUMMARY OF THE INVENTION

FIG. 1 shows a GOA circuit in the prior art. The circuit mainly comprises the following parts: 1) a basic circuit structure composed of thin film transistors (NT1~NT10) and two capacitors; 2) an all gate on module composed of thin film transistors (NT11 and NT12); 3) an all gate off module composed of thin film transistors (NT14); 4) having positive and negative sweep function, and when a control signal (U2D) is at a high level and a control signal (D2U) is at a low level, scanning proceeds from top to bottom row line by line, on the contrary, when the U2D is at a low level and the D2U is at a high level, the scanning proceeds from bottom to top line by line.

As shown in FIGS. 2 and 3, in clock signal driving modes (CK1-CK4), a minimum repeating unit is shown in FIG. 2, with 2 basic units as a loop. A signal timing schematic diagram of the circuit is shown in FIG. 3. Other signals (such as GAS1) are at low levels under normal working conditions, and a signal GAS2 changes from a low level of normal display to a high level during a touch period (TP Term). A plurality of the TP Terms are inserted in a single frame of image in a current touch panel to realize touch function. The N-type metal-oxide-semiconductor (NMOS) GOA maintains high potential required for gradual transmission by capacitance of a node Q. However, thin film transistors (TFTs) are not ideal devices, there will still be a certain leakage current even in an off state. The TP Terms last for a long time, and the pause level of touch control needs to maintain a high potential for a long time, which reduces gradual transmission stability of the GOA.

Therefore, there is an urgent need to provide a GOA circuit and a display panel to improve stability of the GOA circuit.

Solution to Technical Problem

Technical Solutions

The purpose of the present disclosure is to provide a GOA circuit to improve stability of the GOA circuit.

The present disclosure provides a GOA circuit, comprising a plurality of GOA circuit units cascaded, wherein an nth GOA circuit unit comprises a pull-up control circuit unit (101), a pull-up circuit unit (102), a first pull-down control circuit unit (103), a second pull-down control circuit unit (104), a pull-down circuit unit (105), a gate opening unit (106), a first capacitor (C1), and a second capacitor (C2), wherein, the pull-up control circuit unit (101), the pull-up circuit unit (102), the first pull-down control circuit unit (103), the second pull-down control circuit unit (104), the pull-down circuit unit (105), and the gate opening unit (106) are all electrically connected to a first node (Q) and a second node (P), the pull-up control circuit unit (101) is respectively connected to a first control signal (U2D) and a second control signal (D2U), and the pull-up control circuit unit (101) is configured to charge the first node (Q) in the circuit to a high potential, the pull-up circuit unit (102) is connected to a clock signal (CK(n)) to pull an nth scan driving signal (Gn) of the nth GOA circuit unit up to a high potential of the clock signal (CK(n)), the first pull-down control circuit unit (103) is respectively connected to a clock signal (CK(n−1)) of a previous stage and a clock signal (CK(n+1)) of a next stage, the first pull-down control circuit unit (103) is connected to the pull-up control circuit unit (101), and the first pull-down control circuit unit (103) is configured to control forward and reverse scanning of the nth GOA unit, the second pull-down control circuit unit (104) is connected to a third control signal (GAS2), when the display panel displays images, the second pull-down control circuit unit (104) is configured to pull down the second node (P) to a low potential, the pull-down circuit unit (105) is connected to a low voltage signal (VGL) to pull down precharge of the first node (Q) and to pull down a potential of the nth scan driving signal G(n) to a low potential, the gate opening unit (106) is connected to a fourth control signal (GAS1), when an abnormal power failure occurs, the gate opening unit (106) is configured to open all the gates in the display area and release charges in the pixels, and one end of the first capacitor (C1) is connected to the first node (Q), and the other end of the first capacitor (C1) is connected to the low voltage signal (VGL), and the first capacitor (C1) is configured to provide and maintain the precharged charges of the first node (Q); one end of the second capacitor (C2) is connected to the second node (P), and the other end of the second capacitor (C2) is connected to the low voltage signal (VGL), and the second capacitor (C2) is configured to provide and maintain the low potential of the second node (P).

In addition, the pull-up control circuit unit (101) comprises: a first thin film transistor (NT1), wherein a gate of the first thin film transistor (NT1) is connected to a scan driving signal G(n−2) of an n−2th GOA circuit unit, a source of the first thin film transistor (NT1) is connected to the first control signal (U2D), and a drain of the first thin film transistor (T11) is connected to the first node (Q); a second thin film transistor (NT2), wherein a gate of the second thin film transistor (NT2) is connected to a scan driving signal G(n+2) of an n+2th GOA circuit unit, a source of the second thin film transistor (NT2) is connected to the first node (Q), and a drain of the second thin film transistor (NT2) is connected to the second control signal (D2U); and a fifth thin film transistor (NT5), wherein a gate of the fifth thin film transistor (NT5) is connected to the first node (Q) and the source of the second thin film transistor (NT2), a drain of the fifth thin film transistor (NT5) is connected to the second node (P), and a source of the fifth thin film transistor (NT5) is connected to the low voltage signal (VGL).

In addition, the first pull-down control circuit unit (103) comprises: a third thin film transistor (NT3), wherein a gate of the third thin film transistor (NT3) is connected to the first control signal (U2D), and a source of the third thin film transistor (NT3) is connected to the clock signal (CK(n+1)) of the next stage; a fourth thin film transistor (NT4), wherein a gate of the fourth thin film transistor (NT4) is connected to the second control signal (D2U), and the drain of the fourth thin film transistor (NT4) is connected to the clock signal (CK(n−1)) of the previous stage; and a sixth thin film transistor (NT6), wherein a gate of the sixth thin film transistor (NT6) is connected to a source of the fourth thin film transistor (NT4) and a drain of the third thin film transistor (NT3), respectively, a source of the sixth thin film transistor (NT6) is connected to a high voltage signal (VGH), and a drain of the sixth thin film transistor (NT6) is connected to the second node (P).

In addition, the second pull-down control circuit unit (104) comprises: a seventh thin film transistor (NT7), wherein a gate of the seventh thin film transistor (NT7) is connected to the pull-up circuit unit, and a source of the seventh thin film transistor (NT7) is connected to the first node (Q); and an eighth thin film transistor (NT8), wherein a gate of the eighth thin film transistor (NT8) is connected to the pull-down circuit unit and the second node (P), a source of the eighth thin film transistor (NT8) is connected to a drain of the seventh thin film transistor (NT7). The drain of the eighth thin film transistor (NT8) is connected to the third control signal (GAS2).

In addition, the pull-up circuit unit (102) comprises: a ninth thin film transistor (NT9), wherein a gate of the ninth thin film transistor (NT9) is connected to a high voltage signal (VGH), and a source of the ninth thin film transistor (NT9) is connected to the first node (Q); and a tenth thin film transistor (NT10), wherein a gate of the tenth thin film transistor (NT10) is connected to a drain of the ninth thin film transistor (NT9), and a source of the tenth thin film transistor (NT10) is connected to the pull-down circuit unit (105), the gate opening unit (106) and the nth scan driving signal G(n) of the nth GOA circuit unit.

In addition, the pull-down circuit unit (105) comprises: a eleventh thin film transistor (NT11), wherein a gate of the eleventh thin film transistor (NT11) is connected to the second node (P), a drain of the eleventh thin film transistor (NT11) is connected to the nth scan driving signal G(n) of the nth GOA circuit unit, and a source of the eleventh thin film transistor (NT11) is connected to the low voltage signal (VGL).

In addition, the gate opening unit (106) comprises: a twelfth thin film transistor (NT12), wherein a gate of the twelfth thin film transistor (NT12) is connected to the second node (P), a drain of the twelfth thin film transistor (NT12) is connected to the fourth control signal (GAS1), and a source of the twelfth thin film transistor (NT12) is connected to the nth scan driving signal G(n) of the nth GOA circuit unit; and a thirteenth thin film transistor (NT13), wherein a gate of the thirteenth thin film transistor (NT13) is connected to the gate of the twelfth thin film transistor (NT12), a drain of the thirteenth thin film transistor (NT13) is connected to the low voltage signal (VGL), and a source of the thirteenth thin film transistor (NT13) is connected to the fourth control signal (GAS1).

In addition, the GOA circuit comprises an NMOS circuit, a PMOS circuit, and a CMOS circuit.

The present disclosure further provides a display panel comprising the GOA circuit.

In addition, a driving architecture of the GOA circuit comprises single driving or dual driving.

Beneficial effect of the present disclosure lies in: the present disclosure provides a GOA circuit and a display panel, wherein the GOA circuit is provided with the second pull-down control circuit unit (104). Combined with a timing diagram, during a touch period, for the gradual transmission first node (Q), through the third control signal (GAS2) and the second control signal (D2U), the first node (Q) changes from a low-level signal to a high-level signal, so that two leakage paths of the first node (Q) disappear, and there is no leakage path at the first node Q during touch, thereby maintaining stability of the first node Q.

BRIEF DESCRIPTION OF THE SEVERAL VIEWS OF THE DRAWINGS

Technical solutions and other beneficial of the present disclosure will be obvious through the following detailed description of embodiments of the present disclosure in conjunction with the accompanying drawings.

DESCRIPTION OF SPECIFIC EMBODIMENTS OF THE INVENTION

Figure 1:
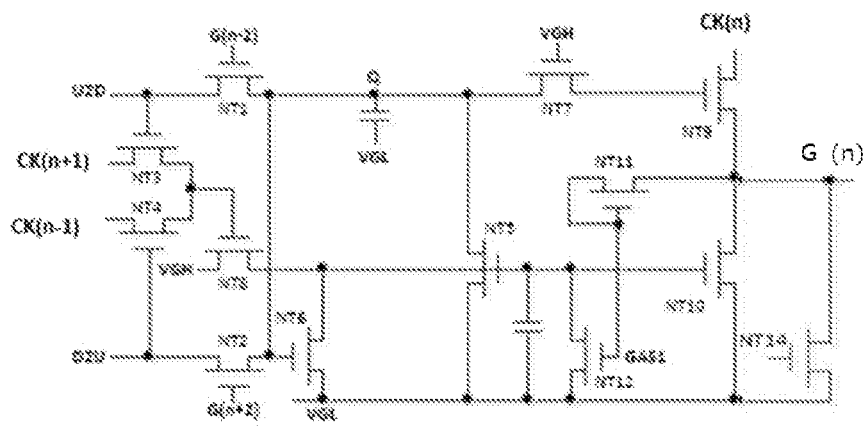
FIG. 1 is a circuit diagram of a GOA circuit provided in the prior art.

Specific structure and functional details disclosed herein are only representative, and are used for the purpose of describing exemplary embodiments of the present disclosure. However, the present disclosure can be implemented in many alternative forms, and should not be interpreted as being limited only to the embodiments set forth herein.

In the description of the present disclosure, it should be understood that orientations or position relationships indicated by the terms "center", "lateral", "upper", "lower", "left", "right", "vertical", "horizontal", "top", "bottom", "inside", "outside" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Figure 4:
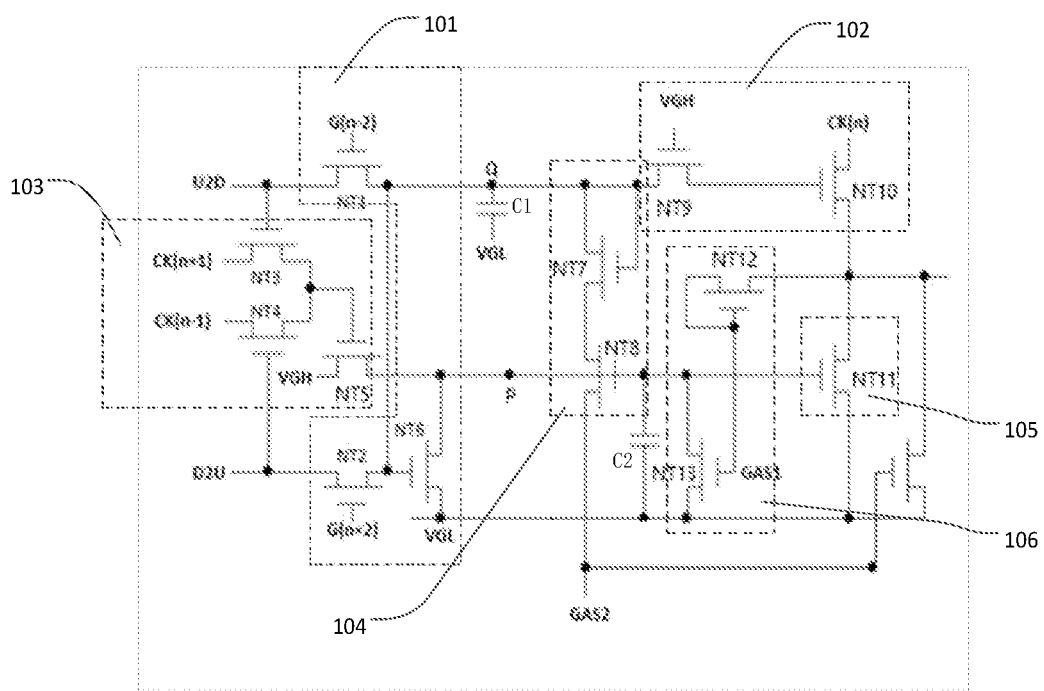
FIG. 4 is a circuit diagram of a GOA circuit provided in the present disclosure.
Figure 5:
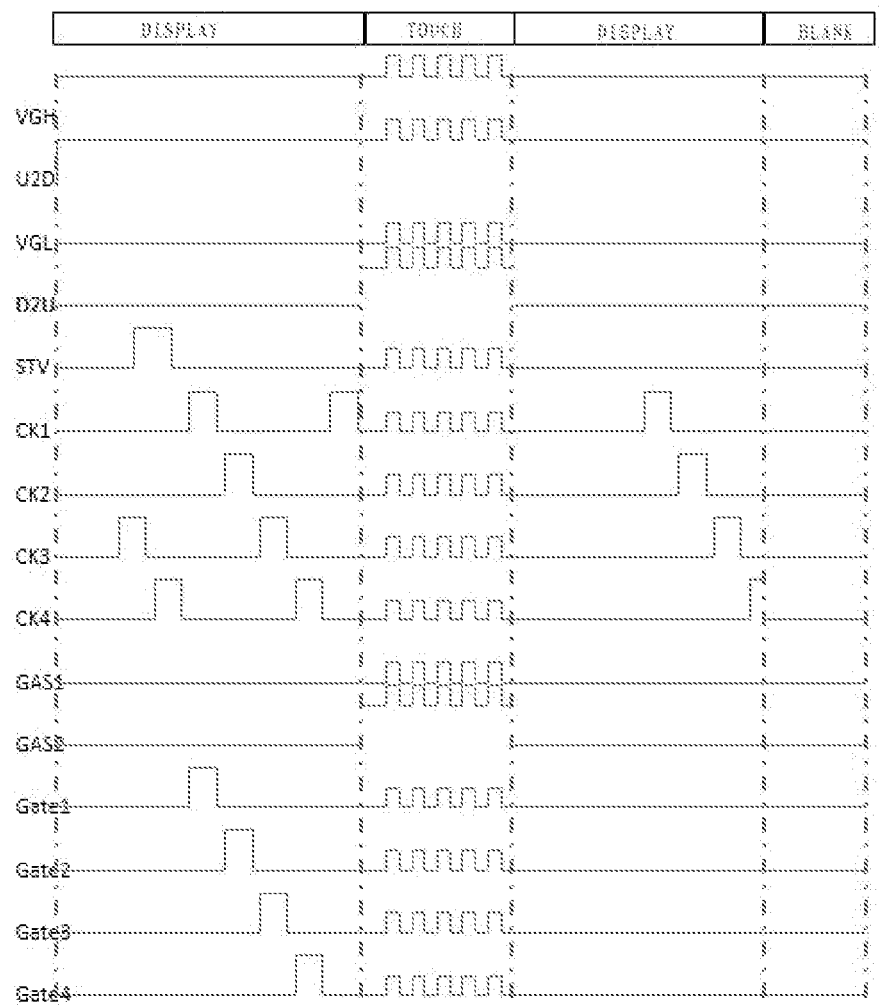
FIG. 5 is a timing control and signal output waveform diagram of the GOA circuit provided in the present disclosure.

As shown in FIGS. 4 and 5, the present disclosure provides a GOA circuit comprising a plurality of GOA circuit units cascaded, wherein an nth GOA circuit unit comprises a pull-up control circuit unit (101), a pull-up circuit unit (102), a first pull-down control circuit unit (103), a second pull-down control circuit unit (104), a pull-down circuit unit (105), a gate opening unit (106), a first capacitor (C1), and a second capacitor (C2).

Wherein, the pull-up control circuit unit (101), the pull-up circuit unit (102), the first pull-down control circuit unit (103), the second pull-down control circuit unit (104), the pull-down circuit unit (105), and the gate opening unit (106) are all electrically connected to a first node (Q) and a second node (P).

The pull-up control circuit unit (101) is respectively connected to a first control signal (U2D) and a second control signal (D2U), and the pull-up control circuit unit (101) is configured to charge the first node (Q) in the circuit to a high potential.

The pull-up control circuit unit (101) comprises a first thin film transistor (NT1), a second thin film transistor (NT2), and a fifth thin film transistor (NT5).

A gate of the first thin film transistor (NT1) is connected to a scan driving signal G(n−2) of an n−2th GOA circuit unit, a source of the first thin film transistor (NT1) is connected to the first control signal (U2D), and a drain of the first thin film transistor (T11) is connected to the first node (Q).

A gate of the second thin film transistor (NT2) is connected to a scan driving signal G(n+2) of an n+2th GOA circuit unit, a source of the second thin film transistor (NT2) is connected to the first node (Q), and a drain of the second thin film transistor (NT2) is connected to the second control signal (D2U).

A gate of the fifth thin film transistor (NT5) is connected to the first node (Q) and the source of the second thin film transistor (NT2), a drain of the fifth thin film transistor (NT5) is connected to the second node (P), and a source of the fifth thin film transistor (NT5) is connected to a low voltage signal (VGL).

The pull-up circuit unit (102) is connected to a clock signal (CK(n)) to pull an nth scan driving signal (Gn) of the nth GOA circuit unit up to a high potential of the clock signal (CK(n)).

The pull-up circuit unit (102) comprises a ninth thin film transistor (NT9) and a tenth thin film transistor (NT10).

A gate of the ninth thin film transistor (NT9) is connected to a high voltage signal (VGH), and a source of the ninth thin film transistor (NT9) is connected to the first node (Q).

A gate of the tenth thin film transistor (NT10) is connected to a drain of the ninth thin film transistor (NT9), and a source of the tenth thin film transistor (NT10) is connected to the pull-down circuit unit (105), the gate opening unit (106) and the nth scan driving signal G(n) of the nth GOA circuit unit.

The first pull-down control circuit unit (103) is respectively connected to a clock signal (CK(n−1)) of a previous stage and a clock signal (CK(n+1)) of a next stage. The first pull-down control circuit unit (103) is connected to the pull-up control circuit unit (101), and the first pull-down control circuit unit (103) is configured to control forward and reverse scanning of the nth GOA unit.

The first pull-down control circuit unit (103) comprises a third thin film transistor (NT3), a fourth thin film transistor (NT4), and a sixth thin film transistor (NT6).

During the forward scanning, the U2D is High, and the NT3 is connected to a gate of the NT6. During the reverse scanning, the D2U is High, and the NT4 is connected to the gate of the NT6.

A gate of the third thin film transistor (NT3) is connected to the first control signal (U2D), and a source of the third thin film transistor (NT3) is connected to the clock signal of the next stage (CK(n+1)).

A gate of the fourth thin film transistor (NT4) is connected to the second control signal (D2U), and the drain of the fourth thin film transistor (NT4) is connected to the clock signal of the previous stage (CK(n−1)).

The gate of the sixth thin film transistor (NT6) is connected to a source of the fourth thin film transistor (NT4) and a drain of the third thin film transistor (NT3), respectively, a source of the sixth thin film transistor (NT6) is connected to the high voltage signal (VGH), and a drain of the sixth thin film transistor (NT6) is connected to the second node (P).

The second pull-down control circuit unit (104) is connected to a third control signal (GAS2). When the display panel displays images, the second pull-down control circuit unit (104) is configured to pull down the second node (P) to a low potential, and when the display panel is touched, the second pull-down control circuit unit (104) is configured to prevent the first node Q of a non-gradual transmission stage from being abnormally pulled up.

The second pull-down control circuit unit (104) comprises a seventh thin film transistor (NT7) and an eighth thin film transistor (NT8).

NT8: During display period, the second node P of the non-gradual transmission stage pulls down the first node Q and keeps the first node Q at a low-level.

NT7: During touch, GAS2 is at a high level to prevent the first node Q of non-gradual transmission stage from being abnormally pulled up.

A gate of the seventh thin film transistor (NT7) is connected to the pull-up circuit unit 102, and a source of the seventh thin film transistor (NT7) is connected to the first node (Q).

A gate of the eighth thin film transistor (NT8) is connected to the pull-down circuit unit 105 and the second node (P), a source of the eighth thin film transistor (NT8) is connected to a drain of the seventh thin film transistor (NT7). A drain of the eighth thin film transistor (NT8) is connected to the third control signal (GAS2).

The pull-down circuit unit (105) is connected to the low voltage signal (VGL) to pull down precharge of the first node (Q) and to pull down a potential of the nth scan driving signal G(n) to a low potential.

The pull-down circuit unit (105) comprises an eleventh thin film transistor (NT11).

A gate of the eleventh thin film transistor (NT11) is connected to the second node (P), a drain of the eleventh thin film transistor (NT11) is connected to the nth scan driving signal G(n) of the nth GOA circuit unit, and a source of the eleventh thin film transistor (NT11) is connected to the low voltage signal (VGL).

The gate opening unit (106) is connected to a fourth control signal (GAS1). When an abnormal power failure occurs, the gate opening unit (106) is configured to open all the gates in the display area and release charges in the pixels.

The gate opening unit (106) comprises a twelfth thin film transistor (NT12) and a thirteenth thin film transistor (NT13). When an abnormal power failure occurs, the GAS1 gives a high level, such that all the gates in the display area are opened, and the charges in the pixels are released to prevent residual charges from causing image retention.

A gate of the twelfth thin film transistor (NT12) is connected to a fourth control signal (GAS1), a drain of the twelfth thin film transistor (NT12) is connected to the fourth control signal (GAS1), and a source of the twelfth thin film transistor (NT12) is connected to the nth scan driving signal G(n) of the nth GOA circuit unit.

A gate of the thirteenth thin film transistor (NT13) is connected to the gate of the twelfth thin film transistor (NT12), a drain of the thirteenth thin film transistor (NT13) is connected to the low voltage signal (VGL), and a source of the thirteenth thin film transistor (NT13) is connected to the fourth control signal (GAS1).

One end of the first capacitor (C1) is connected to the first node (Q), and the other end of the first capacitor (C1) is connected to the low voltage signal (VGL). The first capacitor (C1) is configured to provide and maintain the precharged charges of the first node (Q). One end of the second capacitor (C2) is connected to the second node (P), and the other end of the second capacitor (C2) is connected to the low voltage signal (VGL). The second capacitor (C2) is configured to provide and maintain the low potential of the second node (P).

In an embodiment, the GOA circuit comprises an NMOS circuit, a PMOS circuit, and a CMOS circuit.

The present disclosure provides a display panel comprising the GOA circuit.

The GOA circuit is provided with the second pull-down control circuit unit (104). Combined with the timing diagram, during a touch period, for the gradual transmission first node (Q), through the third control signal (GAS2) and the second control signal (D2U), the first node (Q) changes from a low-level signal to a high-level signal, so that two leakage paths of the first node (Q) disappear, and there is no leakage path at the first node Q during touch, thereby maintaining stability of the first node Q.

For non-gradual transmission first node Q, the gate of NT2 corresponding to D2U is at a low level, and the gate of NT7, which is the non-gradual transmission first node Q, is at a low level, so the risk of non-gradual transmission first node Q being abnormally pulled up is low.

A driving architecture of the GOA circuit comprises single driving or dual driving.

Figure 6:
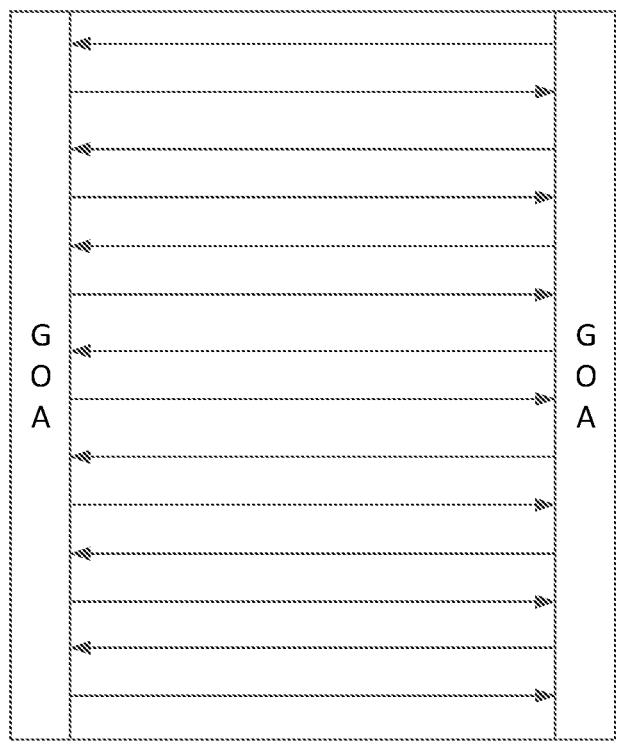
FIG. 6 is a schematic diagram of a single side driving of the GOA circuit in a display panel provided in the present disclosure.
Figure 7:
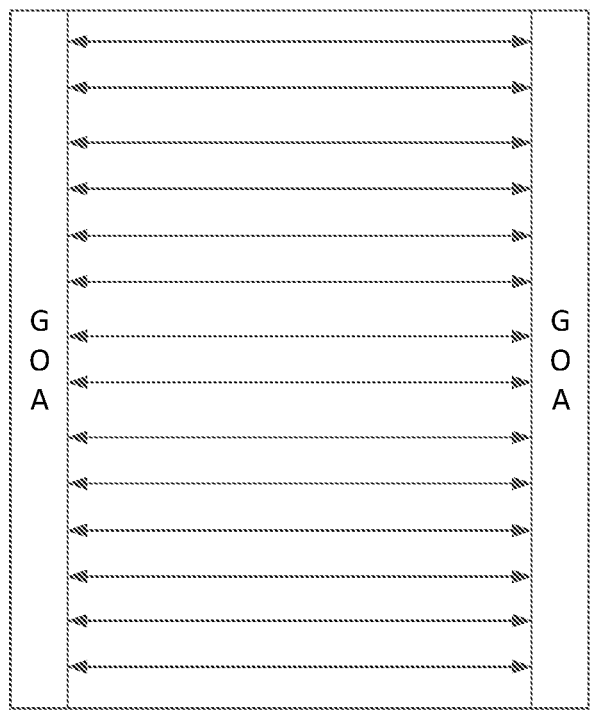
FIG. 7 is a schematic diagram of a dual-side driving of the GOA circuit in the display panel provided in the present disclosure.

As shown in FIG. 6, a driving direction of the GOA circuits on the left and right sides is unidirectional driving, and a driving direction of the GOA circuit shown in FIG. 7 is a simultaneous driving of the left and right sides.

Figure 2:
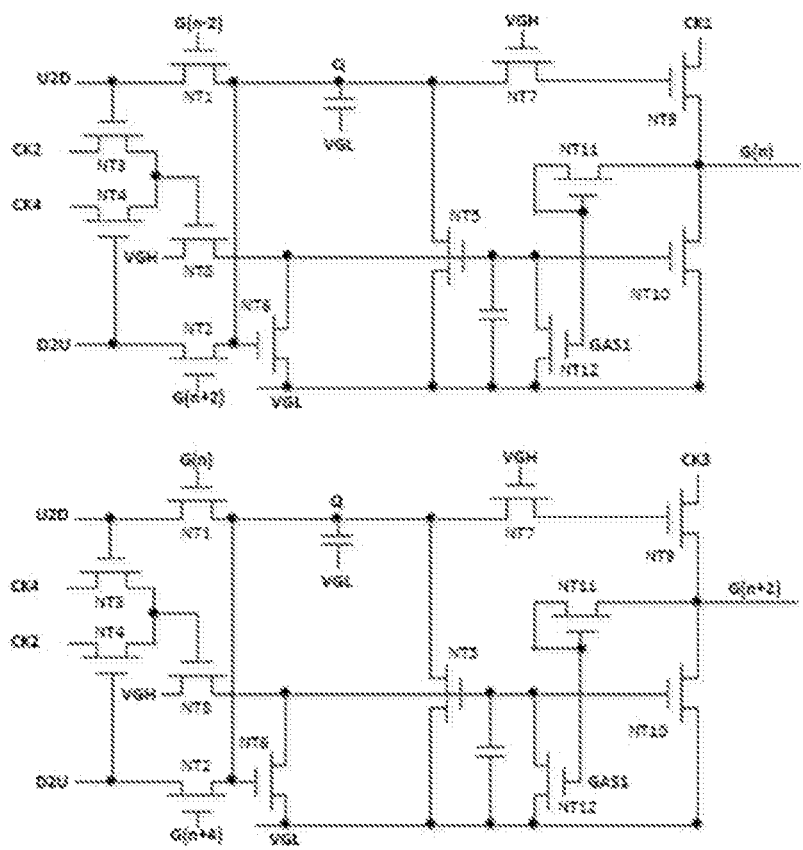
FIG. 2 is a circuit diagram of a repeating unit of the GOA circuit provided in the prior art.
Figure 3:
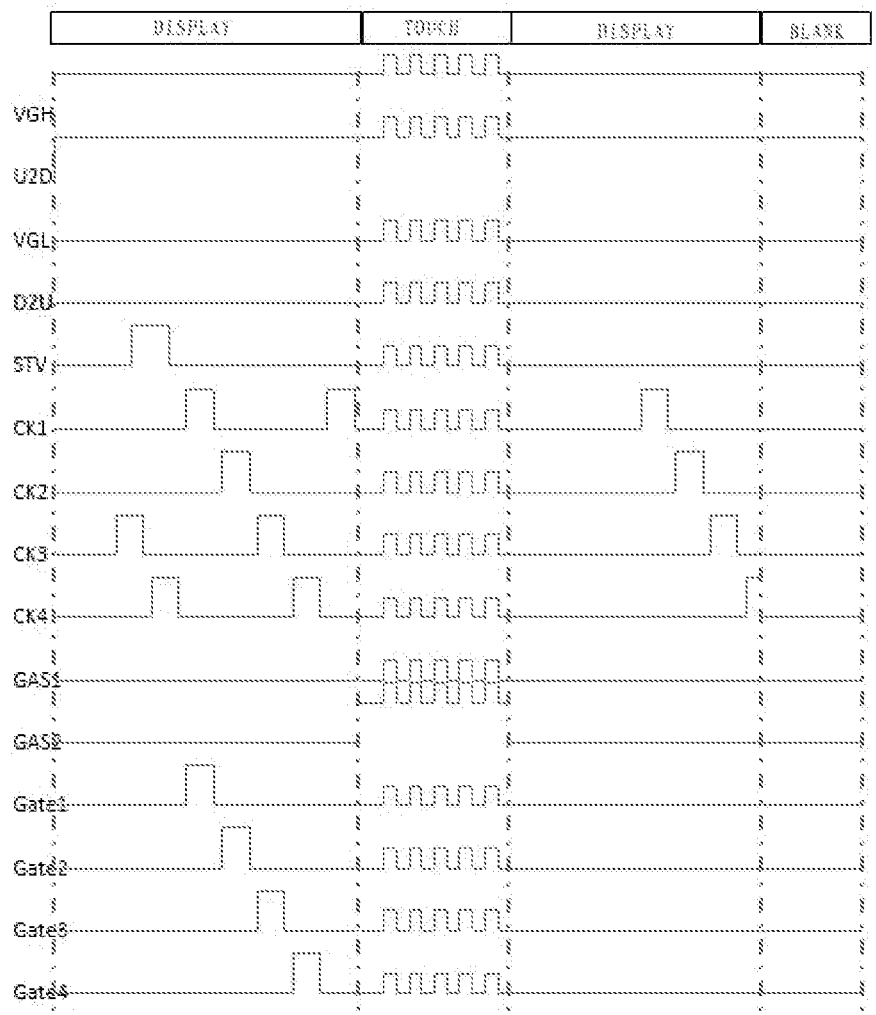
FIG. 3 is a timing control and signal output waveform diagram of the GOA circuit provided in the prior art.

The number of clock signals of the GOA circuit can be 4CK as shown in FIG. 2, or also can be 6CK or 8CK.

In summary, although the present disclosure has been disclosed as above in preferred embodiments, the above-mentioned preferred embodiments are not intended to limit the present disclosure, and those of ordinary skill in the art can make various decisions without departing from the spirit and scope of the present disclosure. Therefore, the protection scope of the present disclosure is subject to the scope defined by the claims.

What is claimed is:

1. A GOA circuit, comprising a plurality of GOA circuit units cascaded, wherein an nth GOA circuit unit comprises a pull-up control circuit unit (101), a pull-up circuit unit (102), a first pull-down control circuit unit (103), a second pull-down control circuit unit (104), a pull-down circuit unit (105), a gate opening unit (106), a first capacitor (C1), and a second capacitor (C2);

wherein, the pull-up control circuit unit (101), the pull-up circuit unit (102), the first pull-down control circuit unit (103), the second pull-down control circuit unit (104), the pull-down circuit unit (105), and the gate opening unit (106) are all electrically connected to a first node (Q) and a second node (P);

the pull-up control circuit unit (101) is respectively connected to a first control signal (U2D) and a second control signal (D2U), and the pull-up control circuit unit (101) is configured to charge the first node (Q) in the GOA circuit to a high potential;

the pull-up circuit unit (102) is connected to a clock signal (CK(n)) to pull an nth scan driving signal (Gn) of the nth GOA circuit unit up to a high potential of the clock signal (CK(n));

the first pull-down control circuit unit (103) is respectively connected to a clock signal (CK(n−1)) of a previous stage and a clock signal (CK(n+1)) of a next stage, the first pull-down control circuit unit (103) is connected to the pull-up control circuit unit (101), and the first pull-down control circuit unit (103) is configured to control forward and reverse scanning of the nth GOA unit;

the second pull-down control circuit unit (104) is connected to a third control signal (GAS2), when a display panel comprising the GOA circuit displays images, the second pull-down control circuit unit (104) is configured to pull down the second node (P) to a low potential;

the pull-down circuit unit (105) is connected to a low voltage signal (VGL) to pull down precharge of the first node (Q) and to pull down a potential of the nth scan driving signal G(n) to a low potential;

the gate opening unit (106) is connected to a fourth control signal (GAS1), when an abnormal power failure occurs, the gate opening unit (106) is configured to open all gates in a display area and release charges in pixels; and one end of the first capacitor (C1) is connected to the first node (Q), the other end of the first capacitor (C1) is connected to the low voltage signal (VGL), and the first capacitor (C1) is configured to provide and maintain the precharged charges of the first node (Q); one end of the second capacitor (C2) is connected to the second node (P), the other end of the second capacitor (C2) is connected to the low voltage signal (VGL), and the second capacitor (C2) is configured to provide and maintain the low potential of the second node (P), and wherein the second pull-down control circuit unit (104) comprises:

a seventh thin film transistor (NT7), wherein a gate of the seventh thin film transistor (NT7) is connected to the pull-up circuit unit and the first node (Q), and a source of the seventh thin film transistor (NT7) is connected to the first node (Q); and an eighth thin film transistor (NT8), wherein a gate of the eighth thin film transistor (NT8) is connected to the pull-down circuit unit and the second node (P), a source of the eighth thin film transistor (NT8) is connected to drain of the seventh thin film transistor (NT7), and a drain of the eighth thin film transistor (NT8) is connected to the third control signal (GAS2).

2. The GOA circuit of claim 1, wherein, the pull-up control circuit unit (101) comprises:

a first thin film transistor (NT1), wherein a gate of the first thin film transistor (NT1) is connected to a scan driving signal G(n−2) of an (n−2) th GOA circuit unit, a source of the first thin film transistor (NT1) is connected to the first control signal (U2D), and a drain of the first thin film transistor (NT1) is connected to the first node (Q);

a second thin film transistor (NT2), wherein a gate of the second thin film transistor (NT2) is connected to a scan driving signal G(n+2) of an (n+2) th GOA circuit unit, a source of the second thin film transistor (NT2) is connected to the first node (Q), and a drain of the second thin film transistor (NT2) is connected to the second control signal (D2U); and a sixth thin film transistor (NT6), wherein a gate of the sixth thin film transistor (NT6) is connected to the first node (Q) and the source of the second thin film transistor (NT2), a drain of the sixth thin film transistor (NT6) is connected to the second node (P), and a source of the sixth thin film transistor (NT6) is connected to the low voltage signal (VGL).

3. The GOA circuit of claim 1, wherein, the first pull-down control circuit unit (103) comprises:

a third thin film transistor (NT3), wherein a gate of the third thin film transistor (NT3) is connected to the first control signal (U2D), and a source of the third thin film transistor (NT3) is connected to the clock signal (CK(n+1)) of the next stage;

a fourth thin film transistor (NT4), wherein a gate of the fourth thin film transistor (NT4) is connected to the second control signal (D2U), and a drain of the fourth thin film transistor (NT4) is connected to the clock signal (CK(n−1)) of the previous stage; and a fifth thin film transistor (NT5), wherein a gate of the fifth thin film transistor (NT5) is connected to a source of the fourth thin film transistor (NT4) and a drain of the third thin film transistor (NT3), respectively, a source of the fifth thin film transistor (NT5) is connected to a high voltage signal (VGH), and a drain of the fifth thin film transistor (NT5) is connected to the second node (P).

4. The GOA circuit of claim 1, wherein, the pull-up circuit unit (102) comprises:

a ninth thin film transistor (NT9), wherein a gate of the ninth thin film transistor (NT9) is connected to a high voltage signal (VGH), and a source of the ninth thin film transistor (NT9) is connected to the first node (Q); and a tenth thin film transistor (NT10), wherein a gate of the tenth thin film transistor (NT10) is connected to a drain of the ninth thin film transistor (NT9), and a source of the tenth thin film transistor (NT10) is connected to the pull-down circuit unit (105), the gate opening unit (106) and the nth scan driving signal G(n) of the nth GOA circuit unit.

5. The GOA circuit of claim 1, wherein, the pull-down circuit unit (105) comprises:

an eleventh thin film transistor (NT11), wherein a gate of the eleventh thin film transistor (NT11) is connected to the second node (P), a drain of the eleventh thin film transistor (NT11) is connected to the nth scan driving signal G(n) of the nth GOA circuit unit, and a source of the eleventh thin film transistor (NT11) is connected to the low voltage signal (VGL).

6. The GOA circuit of claim 1, wherein, the gate opening unit (106) comprises:

a twelfth thin film transistor (NT12), wherein a gate of the twelfth thin film transistor (NT12) is connected to the fourth control signal (GAS1), a drain of the twelfth thin film transistor (NT12) is connected to the fourth control signal (GAS1), and a source of the twelfth thin film transistor (NT12) is connected to the nth scan driving signal G(n) of the nth GOA circuit unit; and a thirteenth thin film transistor (NT13), wherein a gate of the thirteenth thin film transistor (NT13) is connected to the gate of the twelfth thin film transistor (NT12), a drain of the thirteenth thin film transistor (NT13) is connected to the low voltage signal (VGL), and a source of the thirteenth thin film transistor (NT13) is connected to the second node (P).

7. The GOA circuit of claim 1, wherein, the GOA circuit further comprises an NMOS circuit, a PMOS circuit, and a CMOS circuit.

8. A display panel, wherein the display panel comprises a GOA circuit, wherein the GOA circuit comprises a plurality of GOA circuit units cascaded, wherein an nth GOA circuit unit comprises a pull-up control circuit unit (101), a pull-up circuit unit (102), a first pull-down control circuit unit (103), a second pull-down control circuit unit (104), a pull-down circuit unit (105), a gate opening unit (106), a first capacitor (C1), and a second capacitor (C2);

wherein, the pull-up control circuit unit (101), the pull-up circuit unit (102), the first pull-down control circuit unit (103), the second pull-down control circuit unit (104), the pull-down circuit unit (105), and the gate opening unit (106) are all electrically connected to a first node (Q) and a second node (P);

the pull-up control circuit unit (101) is respectively connected to a first control signal (U2D) and a second control signal (D2U), and the pull-up control circuit unit (101) is configured to charge the first node (Q) in the GOA circuit to a high potential;

the pull-up circuit unit (102) is connected to a clock signal (CK(n)) to pull an nth scan driving signal (Gn) of the n-th GOA circuit unit up to a high potential of the clock signal (CK(n));

the first pull-down control circuit unit (103) is respectively connected to a clock signal (CK(n−1)) of a previous stage and a clock signal (CK(n+1)) of a next stage, the first pull-down control circuit unit (103) is connected to the pull-up control circuit unit (101), and the first pull-down control circuit unit (103) is configured to control forward and reverse scanning of the nth GOA unit;

the second pull-down control circuit unit (104) is connected to a third control signal (GAS2), when the display panel displays images, the second pull-down control circuit unit (104) is configured to pull down the second node (P) to a low potential;

the pull-down circuit unit (105) is connected to a low voltage signal (VGL) to pull down precharge of the first node (Q) and to pull down a potential of the nth scan driving signal G(n) to a low potential;

the gate opening unit (106) is connected to a fourth control signal (GAS1), when an abnormal power failure occurs, the gate opening unit (106) is configured to open all gates in a display area and release charges in pixels, and one end of the first capacitor (C1) is connected to the first node (Q), the other end of the first capacitor (C1) is connected to the low voltage signal (VGL), and the first capacitor (C1) is configured to provide and maintain the precharged charges of the first node (Q); one end of the second capacitor (C2) is connected to the second node (P), the other end of the second capacitor (C2) is connected to the low voltage signal (VGL), and the second capacitor (C2) is configured to provide and maintain the low potential of the second node (P), and wherein the second pull-down control circuit unit (104) comprises:

a seventh thin film transistor (NT7), wherein a gate of the seventh thin film transistor (NT7) is connected to the pull-up circuit unit and the first node (Q), and a source of the seventh thin film transistor (NT7) is connected to the first node (Q); and an eighth thin film transistor (NT8), wherein a gate of the eighth thin film transistor (NT8) is connected to the pull-down circuit unit and the second node (P), a source of the eighth thin film transistor (NT8) is connected to a drain of the seventh thin film transistor (NT7), and a drain of the eighth thin film transistor (NT8) is connected to the third control signal (GAS2).

9. The display panel of claim 8, wherein, the pull-up control circuit unit (101) comprises:

a first thin film transistor (NT1), wherein a gate of the first thin film transistor (NT1) is connected to a scan driving signal G(n−2) of an n−2th GOA circuit unit, a source of the first thin film transistor (NTT) is connected to the first control signal (U2D), and a drain of the first thin film transistor (NTT) is connected to the first node (Q);

a second thin film transistor (NT2), wherein a gate of the second thin film transistor (NT2) is connected to a scan driving signal G(n+2) of an n+2th GOA circuit unit, a source of the second thin film transistor (NT2) is connected to the first node (Q), and a drain of the second thin film transistor (NT2) is connected to the second control signal (D2U); and a sixth thin film transistor (NT6), wherein a gate of the sixth thin film transistor (NT6) is connected to the first node (Q) and the source of the second thin film transistor (NT2), a drain of the sixth thin film transistor (NT6) is connected to the second node (P), and a source of the sixth thin film transistor (NT6) is connected to the low voltage signal (VGL).

10. The display panel of claim 8, wherein, the first pull-down control circuit unit (103) comprises:

a third thin film transistor (NT3), wherein a gate of the third thin film transistor (NT3) is connected to the first control signal (U2D), and a source of the third thin film transistor (NT3) is connected to the clock signal (CK (n+1)) of the next stage;

a fourth thin film transistor (NT4), wherein a gate of the fourth thin film transistor (NT4) is connected to the second control signal (D2U), and the drain of the fourth thin film transistor (NT4) is connected to the clock signal (CK(n−1)) of the previous stage; and a fifth thin film transistor (NT5), wherein a gate of the fifth thin film transistor (NT5) is connected to a source of the fourth thin film transistor (NT4) and a drain of the third thin film transistor (NT3), respectively, a source of the fifth thin film transistor (NT5) is connected to a high voltage signal (VGH), and a drain of the fifth thin film transistor (NT5) is connected to the second node (P).

11. The display panel of claim 8, wherein, the pull-up circuit unit (102) comprises:

a ninth thin film transistor (NT9), wherein a gate of the ninth thin film transistor (NT9) is connected to a high voltage signal (VGH), and a source of the ninth thin film transistor (NT9) is connected to the first node (Q); and a tenth thin film transistor (NT10), wherein a gate of the tenth thin film transistor (NT10) is connected to a drain of the ninth thin film transistor (NT9), and a source of the tenth thin film transistor (NT10) is connected to the pull-down circuit unit (105), the gate opening unit (106) and the nth scan driving signal G(n) of the nth GOA circuit unit.

12. The display panel of claim 8, wherein, the pull-down circuit unit (105) comprises:

an eleventh thin film transistor (NT11), wherein a gate of the eleventh thin film transistor (NT11) is connected to the second node (P), a drain of the eleventh thin film transistor (NT11) is connected to the nth scan driving signal G(n) of the nth GOA circuit unit, and a source of the eleventh thin film transistor (NT11) is connected to the low voltage signal (VGL).

13. The display panel of claim 8, wherein, the gate opening unit (106) comprises:

a twelfth thin film transistor (NT12), wherein a gate of the twelfth thin film transistor (NT12) is connected to the fourth control signal (GAS1), a drain of the twelfth thin film transistor (NT12) is connected to the fourth control signal (GAS1), and a source of the twelfth thin film transistor (NT12) is connected to the nth scan driving signal G(n) of the nth GOA circuit unit; and a thirteenth thin film transistor (NT13), wherein a gate of the thirteenth thin film transistor (NT13) is connected to the gate of the twelfth thin film transistor (NT12), a drain of the thirteenth thin film transistor (NT13) is connected to the low voltage signal (VGL), and a source of the thirteenth thin film transistor (NT13) is connected to the second node (P).

14. The display panel of claim 8, wherein, a driving architecture of the GOA circuit comprises single driving or dual driving.

* * * * *